Sept. 15, 1953 S. I. TOURSHOU 2,652,450

SYNC SEPARATION AND AUTOMATIC GAIN CONTROL

Filed May 29, 1948

Inventor
Simeon I. Tourshou
By
[signature]
Attorney

Patented Sept. 15, 1953

2,652,450

UNITED STATES PATENT OFFICE 2,652,450

SYNC SEPARATION AND AUTOMATIC GAIN CONTROL

Simeon I. Tourshou, Philadelphia, Pa., assignor to Radio Corporation of America, a corporation of Delaware Application May 29, 1948, Serial No. 30,077

3 Claims. (Cl. 178—7.3)

Figures 1, 2:
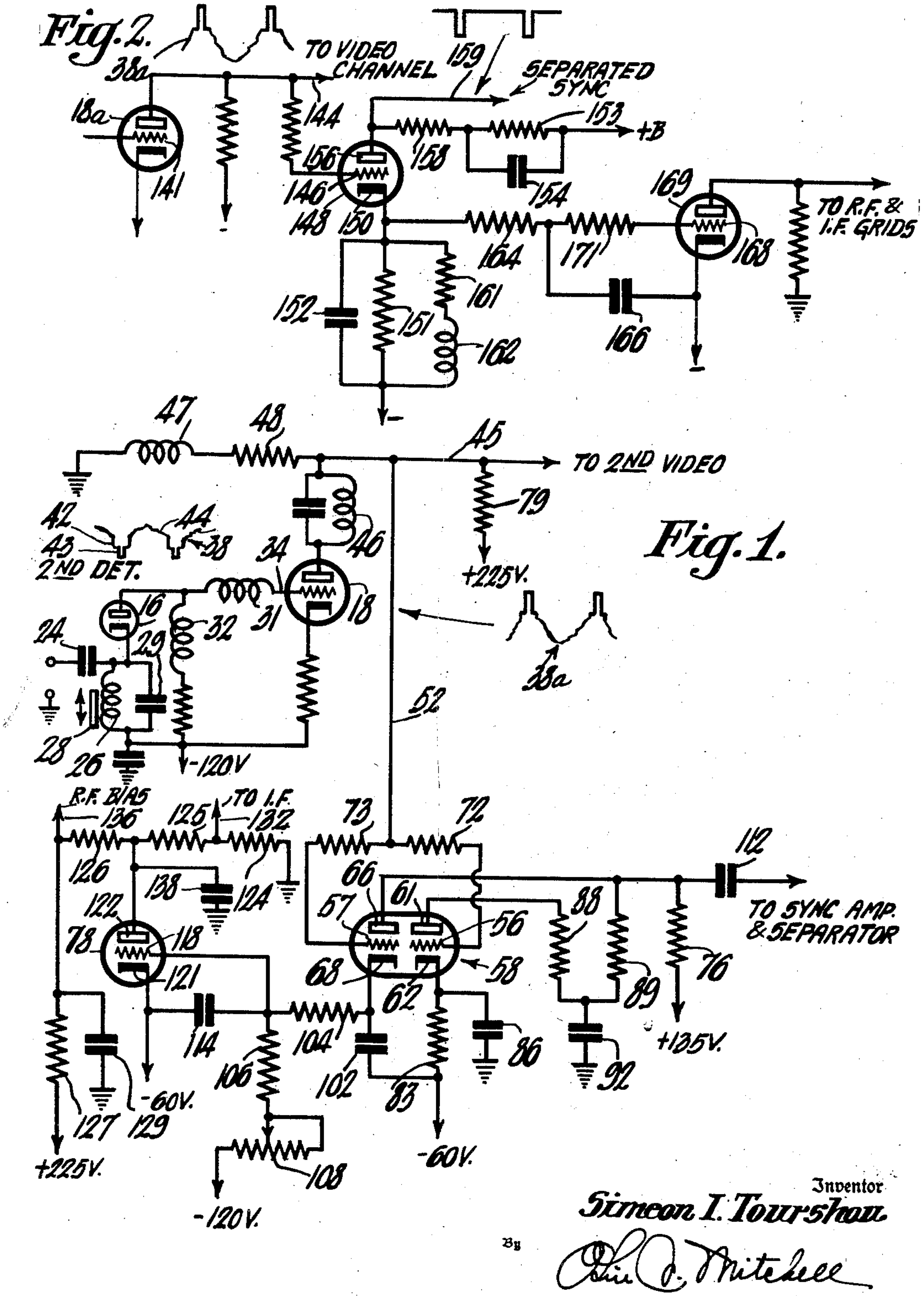

The present invention relates to television receivers and more particularly, but not necessarily exclusively, to novel apparatus in a television receiver for obtaining improved separation of sync signals combined with improved means for controlling the gain of one or more receiver amplifiers.

The general aim or object of the present invention is to provide novel means for separating sync pulses from a composite video signal and also, if desired, for developing a control voltage proportional to the signal amplitude for automatic gain control (A. G. C.) purposes. In accordance with one aspect of the invention, a single tube may perform the complete signal separating function as well as serving to develop a control voltage. In another embodiment of the invention to be disclosed herein, one tube performs a separating and control signal developing function and another cooperating tube performs an additional separating function. The outputs of the two tubes are combined to provide a separated sync signal substantially or completely free of image signals.

Another aim or object of the invention is to provide novel means for employing degeneration in the cathode circuit of a tube to assist in obtaining a signal separating result.

A further object is to develop a direct current control signal as a result of the operation of the separating feature of this invention which involves the cathode circuit of a tube.

A further aim or object of the invention, referred to above in broader terms, resides in the provision of time constant circuit combinations in the cathode circuits of a pair of related vacuum tubes whereby the tubes perform a separating function in a novel manner.

A further object is to provide in a novel manner for obtaining an amplified A. G. C. signal having the desired polarity and amplitude.

Other objects and advantages of the present invention will, of course, become apparent and immediately suggest themselves to those skilled in the art to which the invention is directed from a reading of the following specification in connection with the accompanying drawings in which:

Fig. 1 shows diagrammatically one suitable form of television apparatus embodying the invention and employing two tubes which cooperate in accordance with the invention; and Fig. 2 shows television apparatus having another embodiment of the invention.

Referring now to the drawings, and more particularly to Fig. 1 thereof, there is illustrated a portion of a television receiver of a suitable kind, for example, of the superheterodyne type, comprising the usual first detector, a tunable oscillator, and an intermediate frequency (I. F.) amplifier, none of which is shown as they are not a part of the present invention. The signal receiving equipment, just mentioned, or its equivalent, provides a signal which is fed to a video demodulator or second detector 16 shown, by way of example, as a diode. The output of the second detector 16 is shown as being physically connected to the first stage 18 of a video amplifier (not shown in detail). The video amplifier may comprise several directly coupled stages of amplification and its output may be applied by way of a physically connected coupling arrangement to the control electrode of an image producing tube (not shown) which may be a "kinescope" having appropriate image producing characteristics.

In the illustrative arrangement, the output from the I. F. amplifier (not shown) is delivered to the second detector 16 through a blocking condenser 24 and a tunable impedance, for example, the inductance 26 which is tunable by a movable magnetic core 28 of powdered iron or the like. A condenser 29 assists in tuning the inductance 26. It will be understood that a resonant circuit may exist and serve as the coupling means between the I. F. amplifier and the second detector 16. The resonant circuit, if it is present in the receiver which embodies this invention, includes the tunable inductance 26, the inter-electrode capacity of the last stage tube (not shown) of the I. F. amplifier, and other circuit capacities including the second detector 16.

Series and shunt peaking coils 31 and 32 are effectively arranged in the detector circuit and the demodulated output is applied by way of a connection 34 to the grid of the tube 18. In the illustrative arrangement the coil 31 is included in the connection 34, but it may be connected between the anode of the diode 16 and the connection of the coil 32. The output of the second detector being taken from the anode of the tube 16 provides that sync polarity is in the negative direction as shown conventionally by the waveform 38 adjacent the connection 34. The output signal from the second detector 16 includes blanking signals 42 and horizontal or line sync pulses 43, as well as the image signal portion 44 of a composite signal applied to the television receiver. It will be understood that at appropriate intervals vertical or field sync pulses (not shown) will occur at the lower frame or field frequency.

The output of the tube 18 is or may be directly coupled to the grid of the tube of the next amplifier stage (not shown) through a physical or conductive coupling 45. Series and shunt peaking coils 46 and 47, respectively, and a resistor 48 may be included in a coupling network between the tube 18 and the grid of the tube of the next stage if desirable or necessary in order to avoid loss of high frequency components of the signal. The signal appearing in the connection 45 is substantially a replica of the plate-current wave of the tube 18 but is a voltage wave 38*a* in the positive direction.

In accordance with the invention, the output of the tube 18 appearing in a connection 52 as well as the connection 45 is applied to the control electrodes or grids 56 and 57 of what is in effect a pair of tubes. In the illustrative arrangement, a duplex tube 58 is shown which comprises two independent triode sections. A suitable tube is the type 6SN7-GT but it will be understood that this type is cited only by way of example. A pair of tubes having separate envelopes may be used and they need not be triodes.

The tube section which includes the grid 56 also comprises an anode 61 and cathode 62. The tube section having the grid 57 also includes an anode 66 and a cathode 68. Resistors 72 and 73 are included in the connections to the grids 56 and 57 respectively.

The anodes 61 and 66 are connected through a resistor 76 to a suitable voltage source (not shown) as indicated schematically on the drawing. Electrodes of the sections of the tube 58 and a tube 78, to be described, are connected to points on the voltage source (not shown) having different values. Certain of the tube circuits shown in the illustrative embodiment have physical or conductive coupling to other tube circuits and convenient voltage values have been indicated on the drawing. The voltage values are assumed solely for illustrative purposes and for convenience in describing the invention and its operation.

For example, cathodes of the detector 16 and amplifier tube 18 are indicated as being connected to a negative potential point on the voltage supply source. Solely by way of example, this voltage is indicated as being −120 volts. The anode of the tube 18 is connected through a resistor 79 which is indicated as being connected to a point on the voltage supply source which is positive with respect to the connection of the cathodes of the tubes 16 and 18. Solely by way of example, this voltage is indicated as being +225 volts. However, a path to ground is provided from the anode of the tube 18 through the coils 46 and 47 and the resistor 48. One function of the resistor 79 is to apply a positive voltage on the grids 56 and 57 of the tube 58.

The inductor 47 is grounded and the anode of the tube 18 is positive with respect to its cathode since the latter is connected to a negative point on the power supply. The method of connecting voltage supply sources and the like, and tube electrodes is by now well known, and it is believed that the diagrammatic indication given in the drawing will be sufficient to indicate to those skilled in the art the nature of the tube circuits employed in the receiver which are illustrative only.

Both sections of the tube 58 have a combined function, the result of which is separation or partial separation of sync signals from the video signals. One section of this tube, in operation as a signal separator, provides a voltage which bears such a relation to the received signal that it may be utilized as an A. G. C. signal. The relationship of the parts to provide the combined function will be discussed first.

The circuit for the cathode 62 includes a resistor 83 and a condenser 86. The time constant of this resistor-condenser combination 83 and 86 is sufficiently long to require anode or plate current flow for the full duration of each vertical sync signal. This section of the tube 58, therefore, acts as a partial sync separator for the vertical sync signals. The anode or plate current load for the vertical sync signals includes resistors 88, 89, 76 and a capacitor 92. The resistor 88 and the capacitor 92 act as a filter for removing the horizontal or higher frequency sync signals from the output of the vertical separator.

The section of the tube including the anode or plate 66 acts as a cathode follower to charge a capacitor 102 nearly equal to the positive peaks of the video signal. The resistor 76 acts as a plate load for the horizontal sync signals to provide partially separated horizontal sync. The time constant of the cathode circuit is such that the lower frequency or vertical sync signal is degenerated as far as the plate circuit is concerned. To accomplish this, the time constant of the resistor-condenser combination is short, being only several times the period of the horizontal line. The cathode circuit is completed through resistors 104, 106 and a variable resistor 108. The cathode is returned to a point of negative potential on the voltage supply source (not shown). Solely by way of example, this point is indicated as being −120 volts. The resistor-condenser combination referred to above includes the condenser 102 and the resistors 104, 106 and the included portion of the resistor 108. The short time constant of the resistor-condenser combination in the circuit of the cathode 68 provides that noise or variation interference sets up the cathode bias to a higher value than the signal for a very short time only and does no serious harm to either the horizontal scanning or the A. G. C. to be described.

Since the cathode time constant is short, the circuit is highly degenerative to the vertical sync signals. That is to say, the cathode capacitor charges up to the peak of the vertical sync in a few microseconds and no further plate current flows during the remainder of the vertical sync.

The separate tube section comprising the cathode 62 serves to give the full vertical sync signal as explained above. The output of the two sections of the tube 58 is combined across the resistor 76 and is furnished by way of a coupling condenser 112 to apparatus to be controlled by the separated, or partially separated sync signal. This apparatus, just mentioned, may be a scanning oscillator or a deflection A. F. C. system.

The resistor 104 is the principal component of the R. C. circuit by reason of the presence of a capacitor 114. The variable resistor 108 serves as a level setter for the A. G. C. signal developed by the section of the tube 58 acting as a cathode follower.

The previously mentioned tube 78 serves as a direct current amplifier for the A. G. C. signal developed during operation of the section of the tube 58 which includes the cathode 68 as explained above. The grid 118 of the tube 78 is connected at the junction of the resistor 104, the resistor 106 and the capacitor 114. The cathode 121 is returned to a point of negative voltage on the power supply source (not shown). Solely by way of example, the voltage at this point is indicated as being 60 volts negative. The anode 122 is connected to a network comprising series resistors 124, 125, 126, and 127. The point of connection of the anode to this network is at the junction point of the resistors 125 and 126. Resistor 127 has a very high value and its free end is connected to the D. C. potential source (not shown) at a point of relatively high positive potential. Solely by way of example, this point is indicated as being +225 volts. The resistor 124 as stated previously is connected to ground. A condenser 129 is connected between the end of the resistor 127 and ground.

A connection 132 is taken from between the resistors 124 and 125 which is, or may be, connected to the I. F. amplifier (not shown). A connection 136 is available for connection to the R. F. stages (not shown) of the receiver amplifier. An A. G. C. filter condenser 138 is connected to the anode 122 of the amplifier tube 78.

In operation of the apparatus of Fig. 1, the demodulator 10 provides the demodulated video signal and the amplifier tube 18 amplifies and inverts this signal so that sync is in the positive direction. The circuit of the cathode 68 of the tube 58 serves as a cathode follower charging the condenser 102 to the peaks or nearly to the peaks of sync. Direct current voltage, proportional to the received signal amplitude can be taken from the cathode. This direct current voltage, which is in the nature of a control voltage, is amplified by the tube 78 and inverted so that on strong received signals, the output of the tube 78 is more negative and is, therefore, in the proper direction to serve as an A. G. C. voltage.

The time constant for the circuit of the cathode 68 is short and plate current flows only during peaks of sync. Since the cathode time constant is short, the circuit is highly degenerative to vertical sync which is a signal of relatively long duration.

The tube section including the cathode 62 has a cathode circuit time constant long enough to require plate current to flow for the full duration of the vertical sync signal. The separated vertical sync is filtered by condenser 92 and combined with the output of the other tube section which develops the horizontal sync.

Fig. 2 of drawings discloses a further embodiment of the invention in which a single tube is made to serve the purpose of obtaining the full vertical sync. Tube 18a performs the function of tube 18 of Fig. 1 and it will be understood that the demodulated composite signal is applied to the grid 141 of this tube. The output circuit for this tube is shown conventionally and includes a tap or branch 144 which feeds other stages (not shown) of the video amplifier. The output signal, designated by the reference character 38a, since it is substantially the same signal as that appearing in Fig. 1, is applied to the grid 146 of the tube 148. The cathode circuit for the cathode 150 of this tube includes an R. C. combination comprising a resistor 151 and a condenser 152. The time constant of this R. C. combination is relatively short. In this and other respects it corresponds to the combination of the resistor 104 and the condenser 102 of Fig. 1. Since this time constant is short, the circuit is highly degenerative to the vertical sync signals. The capacitor 152 therefore charges up to the peak of the vertical sync signal in a few micro-seconds and no further plate current flows during the remainder of the vertical sync pulse. The tube 148 develops cathode bias nearly equal to the positive peaks of the video signal and plate current flows only during peaks of the received signal. These peaks are the horizontal sync pulses and sync pulses of voltage appear on the plate.

In the embodiment of Fig. 2, full vertical sync is obtained by a combination of "low frequency boost" in the plate circuit of the tube 148 which increases the plate load for low frequency components contained in the vertical sync. Also a resistance-inductance shunt is connected in the cathode circuit to reduce the cathode impedance for the lower frequency longer duration vertical sync pulses and which also reduces the degenerative effect of the cathode circuit on the vertical sync signals.

More in detail, and by way of example, the low frequency boost feature is provided by a resistor 153 and a condenser 154. These elements are so proportioned with respect to each other and the frequency of the vertical sync signal that they increase the plate load for the vertical sync signal. The plate 156 of the tube 148 is connected to a suitable voltage supply source (not shown) by way of a load resistor 158 and the resistor 153. Separated sync signals are recovered in an output connection 159 to be available for use in any desired manner.

The shunt, mentioned above, around the R. C. combination is provided by a resistor 161 and an inductance 162 connected in series. This series combination is shunted around the R. C. combination 151 and 152.

The A. G. C. signal, developed in operation of the tube 148, is taken from the cathode 150 and filtered by a resistor 164 and a condenser 166 and is applied to the grid 168 of an amplifier tube 169 by way of a resistor 171. The output of this tube may be connected to the desired amplifier grids of the receiver amplifiers (not shown).

Having now described the invention, what is claimed and desired to be secured by the Letters Patent is the following:

1. In television apparatus having automatic gain control means and wherein high frequency and low frequency sync signals and image signals are received as a composite signal in which the sync signals are of greater amplitude than the image signals, means for detecting said composite signal, electric discharge tube means for separating said low frequency sync signals from said image signals, said electric discharge tube means comprising at least an anode, a cathode, and a control electrode, means to couple the composite output of said detecting means to said control electrode, a parallel resistor and condenser combination in circuit with said cathode, the time constant of said resistor and condenser combination being long so as to require plate current to flow for the full duration of each low frequency sync signal, a source of direct current voltage for said anode, a load impedance included in a series circuit from said source to said anode, coupling means to recover said low frequency sync signals appearing across said load impedance, a second electric discharge tube means for separating said high frequency sync signals, said second electric discharge tube means comprising at least a cathode, an anode, and a control electrode, means to couple said output of said detecting means to said second control electrode, a second parallel resistor and condenser combination in circuit with said second cathode, the time constant of said second resistor and condenser combination being comparable to several times the period of the high frequency sync signals, a load impedance included in a series circuit from said source to said second anode, coupling means to recover said high frequency sync signals appearing across said last-named load impedance, and means including said second resistor-condenser combination for deriving from the cathode of said second tube a voltage proportional to the amplitude of said higher frequency sync signals, said voltage being adapted to control said automatic gain control means.

2. In television apparatus wherein high frequency and low frequency sync signals and image signals are received as a composite signal in which the sync signals are of greater amplitude than the image signals, means for detecting said composite signal, electric discharge tube means for separating said low frequency sync signals from said image signals, said electric discharge tube means comprising at least an anode, a cathode, and a control electrode, means to couple the composite output of said detecting means to said control electrode, a parallel resistor and condenser combination in circuit with said cathode, the time constant of said resistor and condenser combination being long so as to require plate current to flow for the full duration of each low frequency sync signal, a source of direct current voltage for said anode, a load impedance included in a series circuit from said source to said anode, coupling means to recover said low frequency sync signals appearing across said load impedance, a second electric discharge tube means for separating said high frequency sync signals, said second electric discharge tube means comprising at least a cathode, an anode, and a control electrode, means to couple said output of said detecting means to said second control electrode, a second parallel resistor and condenser combination in circuit with said second cathode, the time constant of said second resistor and condenser combination being comparable to several times the period of the high frequency sync signals, a load impedance included in a series circuit from said source to said second anode, coupling means to recover said high frequency sync signals appearing across said last-named load impedance and wherein at least a portion of one of said load impedances comprises a portion of the other of said load impedances, whereby said separated sync signals are adapted to be combined in said common load impedance.

3. Television apparatus as set forth in claim 2 which comprises means including said second resistor-condenser combination for deriving from the cathode of said second tube a voltage proportional to the amplitude of said high frequency sync signals adapted to control said automatic gain control.

SIMEON I. TOURSHOU.

References Cited in the file of this patent

UNITED STATES PATENTS

| Number | Name | Date |
|---|---|---|
| 2,170,046 | Anderson et al. | Aug. 22, 1939 |
| 2,194,278 | George | Mar. 19, 1940 |
| 2,196,364 | Schlesinger | Apr. 9, 1940 |
| 2,197,900 | Schlesinger | Apr. 23, 1940 |
| 2,210,384 | Rust et al. | Aug. 6, 1940 |
| 2,223,161 | Anderson | Nov. 26, 1940 |
| 2,226,994 | Schlesinger | Dec. 31, 1940 |
| 2,229,964 | Dome | Jan. 28, 1941 |
| 2,231,863 | Clay | Feb. 18, 1941 |
| 2,240,490 | Cawein | May 6, 1941 |
| 2,240,593 | Wilson | May 6, 1941 |
| 2,250,996 | Mayer | July 29, 1941 |
| 2,251,929 | Freeman et al. | Aug. 12, 1941 |
| 2,263,667 | Wilson | Nov. 25, 1941 |
| 2,269,693 | Schade | Jan. 13, 1942 |
| 2,292,148 | Moe | Aug. 4, 1942 |
| 2,295,346 | Jones et al. | Sept. 8, 1942 |
| 2,317,025 | Bond | Apr. 20, 1943 |
| 2,356,141 | Applegarth | Aug. 22, 1944 |
| 2,425,491 | Schlesinger | Aug. 12, 1947 |

FOREIGN PATENTS

| Number | Country | Date |
|---|---|---|
| 114,997 | Australia | Apr. 23, 1942 |
| 534,548 | Great Britain | Mar. 10, 1941 |